May 18, 1948. H. W. EVANS 2,441,874
GUN MOUNT FOR LAND AND WATER VEHICLES
Filed Feb. 24, 1942 5 Sheets-Sheet 1
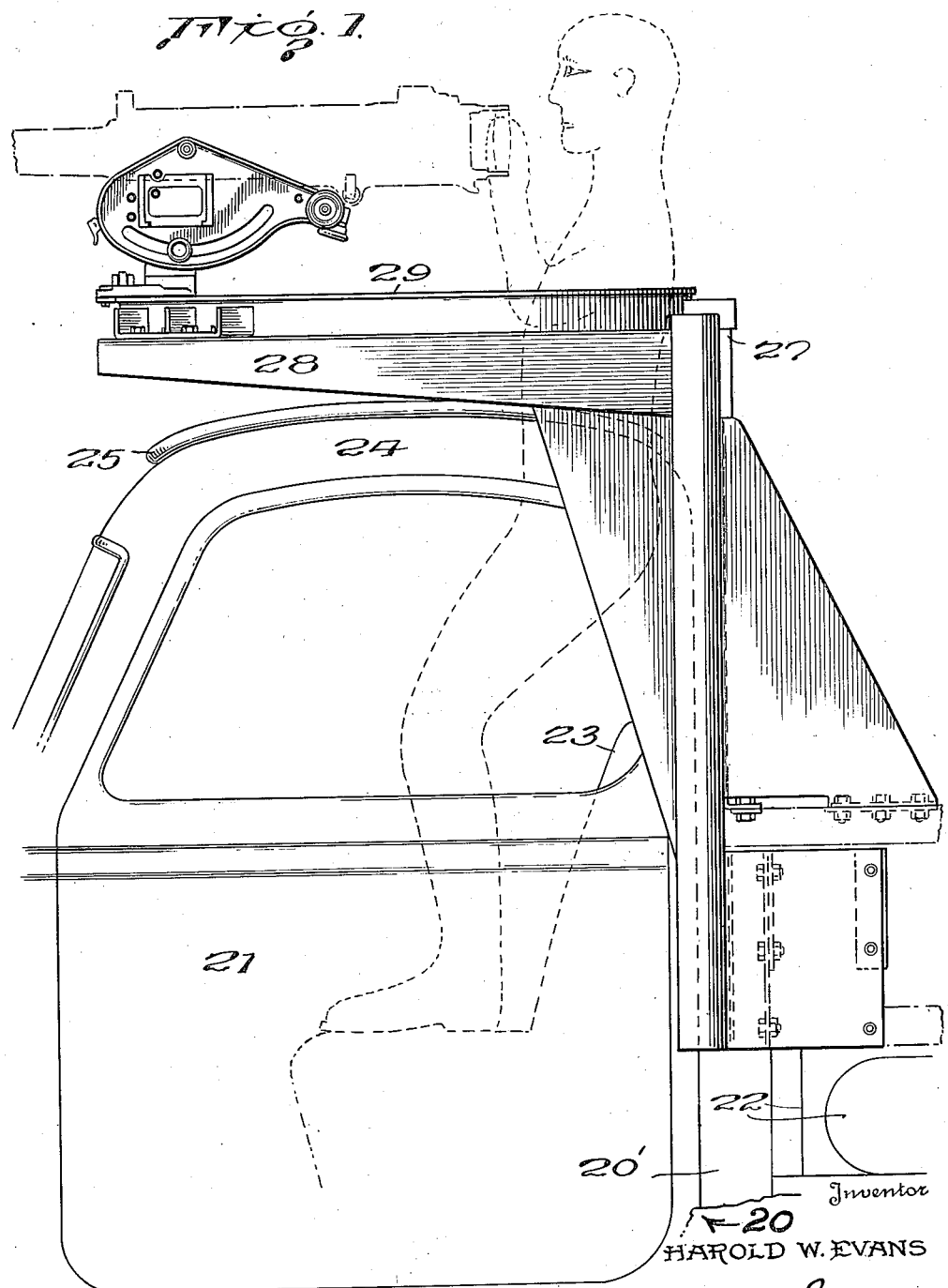
Inventor
HAROLD W. EVANS
By Bernard J. Garvey
Attorney May 18, 1948.  H. W. EVANS  2,441,874
GUN MOUNT FOR LAND AND WATER VEHICLES
Filed Feb. 24, 1942  5 Sheets-Sheet 2
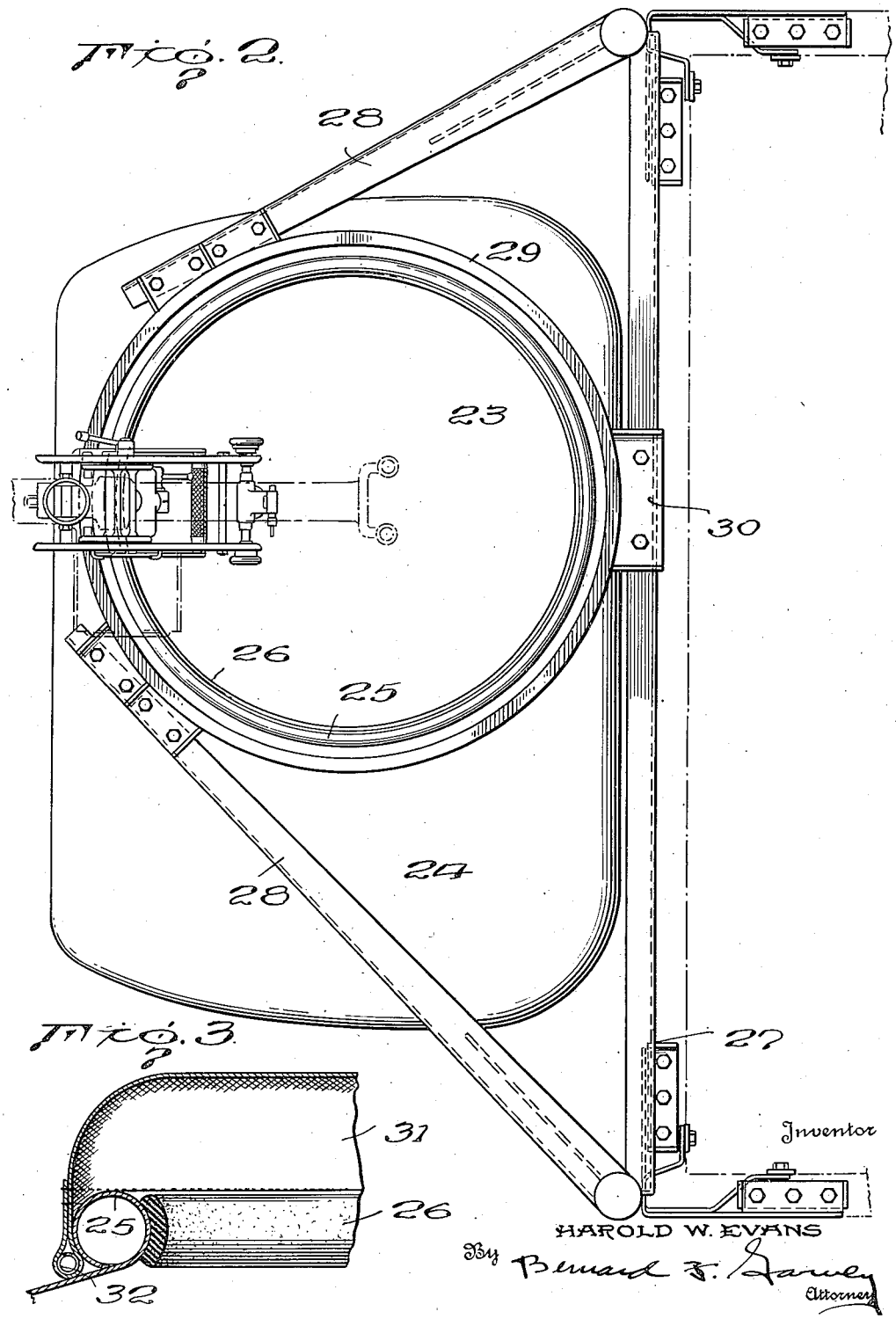
Inventor
HAROLD W. EVANS
By Bernard F. Sawley
Attorney May 18, 1948. H. W. EVANS 2,441,874
GUN MOUNT FOR LAND AND WATER VEHICLES
Filed Feb. 24, 1942 5 Sheets-Sheet 3
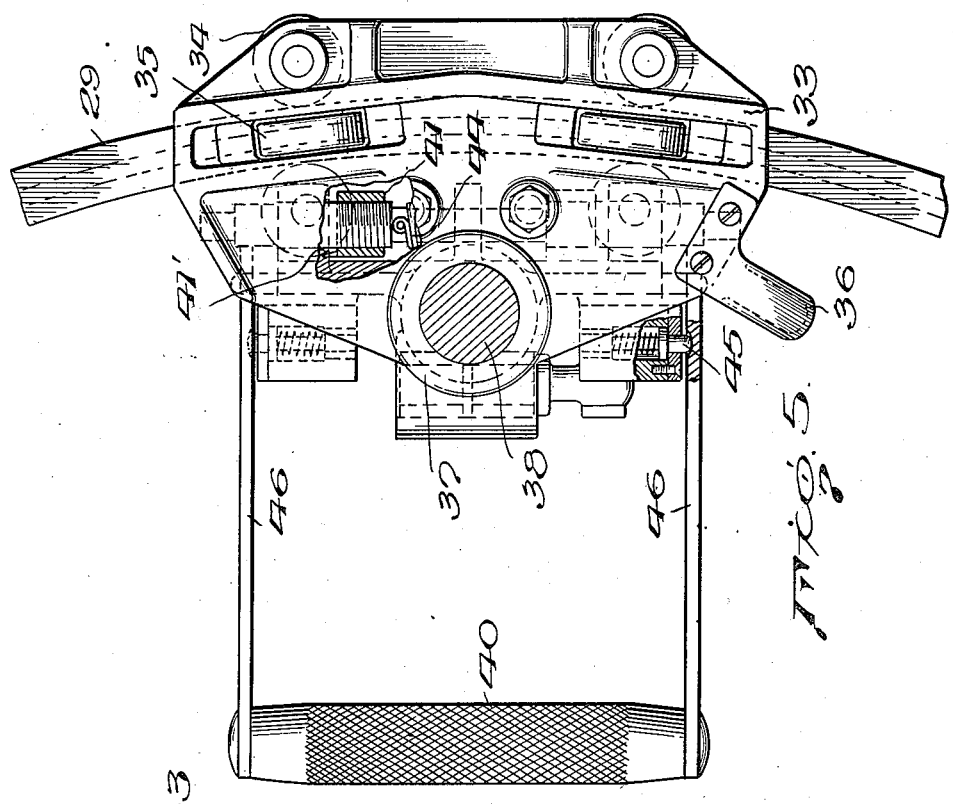
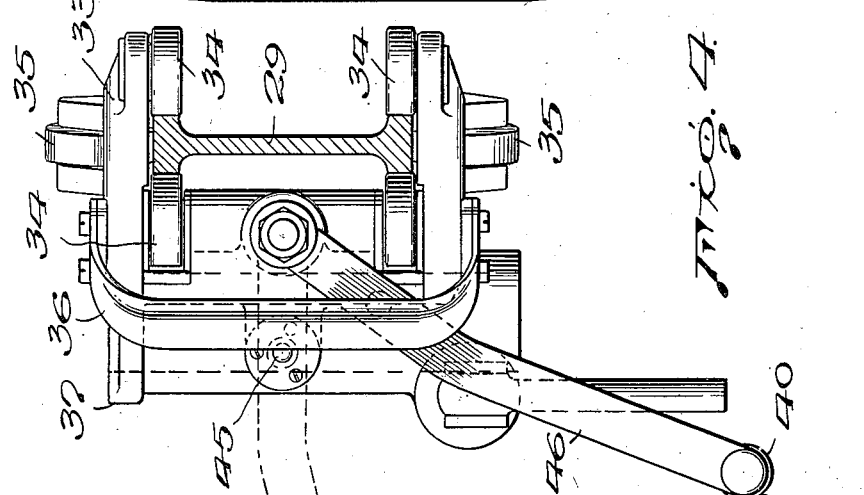
Inventor
HAROLD W. EVANS
By Bernard F. Garvey
Attorney

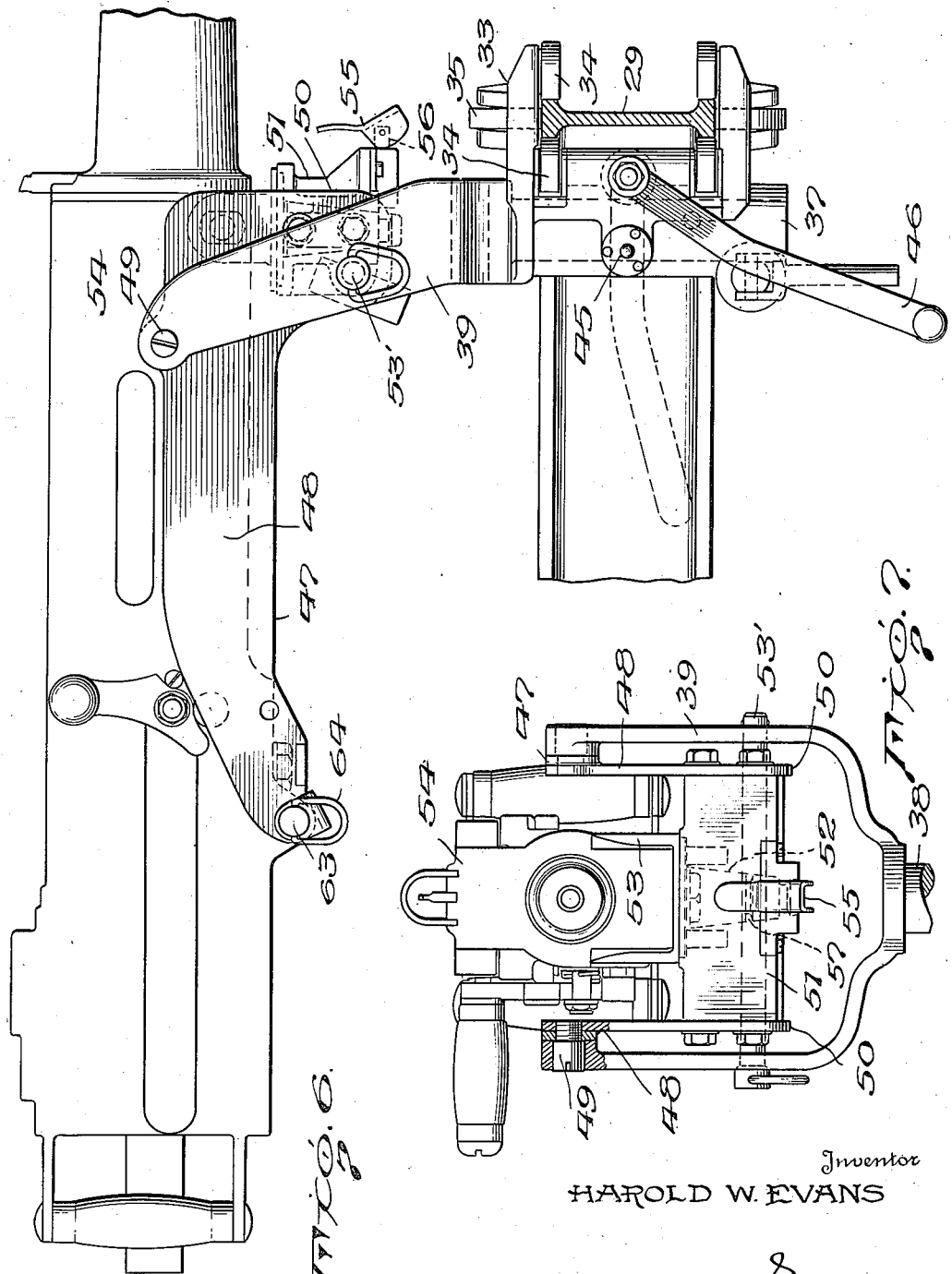

May 18, 1948. H. W. EVANS 2,441,874
GUN MOUNT FOR LAND AND WATER VEHICLES
Filed Feb. 24, 1942 5 Sheets-Sheet 5

Inventor
HAROLD W. EVANS

By Bernard F. Sawley
Attorney

Patented May 18, 1948

2,441,874

UNITED STATES PATENT OFFICE 2,441,874

GUN MOUNT FOR LAND AND WATER VEHICLES

Harold W. Evans, Takoma Park, D. C.

Application February 24, 1942, Serial No. 432,123

5 Claims. (Cl. 89—37)

This application is a continuation in part of my co-pending application, Serial Number 370,026, now Patent 2,409,618, issued October 22, 1946, the invention consisting of a completely collapsible gun mount for land and water vehicles, but especially adapted for use on trucks, with or without cabs.

In a preferred embodiment of this invention, I utilize a truck with the customary driver's seat and overhanging top or roof, the latter being equipped, at one end, with a track within the roof perimeter, the inner diameter of the track being such as to permit the upper part of a gunner's body to project through and above the track to allow movement of a gun on the track and operation of the gun while the gunner is in a standing position on the seat.

Other objects of the invention are to provide a gun mount with an improved carriage capable of more facile and expeditious operation; to provide a simplified form of cradle which is easier to manipulate in adjusting the gun to the desired angularity; and to provide a mount which although particularly adapted for use on land vehicles, is also usable on boats of standard construction.

I am of course aware that many patents have been granted on gun mounts wherein the gun is capable of movement in an arc or orbit and adjustable to a predetermined angularity for attacking both high and low targets, especially for use on aircraft. However, such mounts are incapable of use in carrying out the teaching of the present invention. For example, this invention has especial adaptation for use on vehicles such as Army supply trucks to permit simultaneous operation of the truck and gun, thereby protecting the truck against hostile aircraft, while the truck is moving toward its objective. The customary seat provided in each of these trucks is sufficient to accommodate both the truck driver and the gunner. The gun mount and associate structure is entirely clear of the driver so that operation of the vehicle will be in no way impeded. The gun is bodily movable, at the option of the gunner, throughout a complete circle and is fired while the gunner is standing on the seat alongside of the truck driver.

Additional objects of the invention will be understood from the following description of the preferred forms of the invention, taken in connection with the accompanying drawings, wherein Fig. 1 is a side elevational view of a gun mount constructed in accordance with the present invention, illustrating its application to a truck;

Fig. 2 is a top plan view of the same;

Fig. 3 is a detail enlarged fragmentary sectional view of the cab roof showing the manner of applying a cover or top over the opening in the roof;

Fig. 4 is an end elevational view of the carriage used in the present invention, showing the same mounted on a track, the latter being shown in cross section;

Fig. 5 is a top plan view of the same;

Fig. 6 is a side elevational view of my improved cradle, illustrating the application of the same to the carriage and gun;

Fig. 7 is an end elevational view of the cradle showing a gun mounted therein, a portion being broken away on one side to disclose the manner of mounting the cradle;

Figure 8:
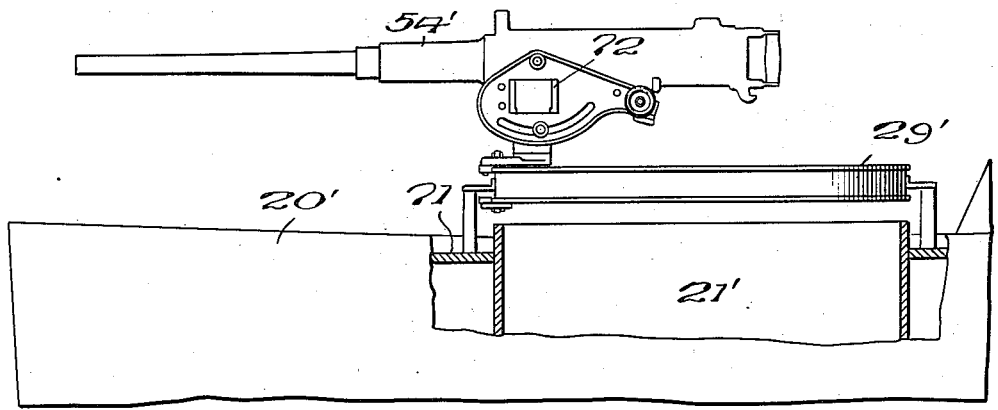
Fig. 8 is an elevational view of a mount constructed in accordance with the present invention, illustrating the application of the same to a boat, the latter being fragmentarily shown.

In order to illustrate the application of my invention, I have in the drawings shown a truck 20, including a body 20', the forward end of the body being in contact with and connected to a cab 21. By moving the body forward into engagement with the base of the cab, sufficient space for the storage of spare tires 22, beneath the forward end of the body, is afforded. The truck cab is provided with the usual seat 23, which is adapted to accommodate the truck driver and a gunner. The cab is provided with a roof 24 having an opening formed at one end, directly over the part of the seat to be occupied by the gunner. The marginal edge of the opening is equipped with a bead 25 formed by reversely rolling the edge of the roof around the opening, as shown to advantage in Fig. 3. The bead is padded with a cushion 26, made of rubber or other suitable material.

A knockdown track supporting frame, generally designated 27, is detachably mounted on the front end of the truck body, the frame including forwardly converging arms 28 which engage the outer periphery of a track or rail 29. The inner diameter of the track is in excess of the diameter of the bead 25 and completely circumscribes the latter. The rear end of the track is supported by a plate 30, a portion of which projects forwardly from the frame 27.

It will be noted, upon reference to Fig. 1 of the drawings, that the front of the frame 27 overhangs the cab 24, the track 29 being spaced above the top of the roof of the cab. The device of the present invention is obviously also adapted for use on cabless trucks. Where the cab is used, the opening in the top thereof may be covered by a detachable top 31. The top is made of canvas or other suitable material and is provided with a marginal spring 32 to permit the cover to be flexed over the bead 25, as illustrated in Fig. 3 of the drawings. The cover may be quickly engaged with and disengaged from the bead in an apparent manner.

Figures 10, 11:
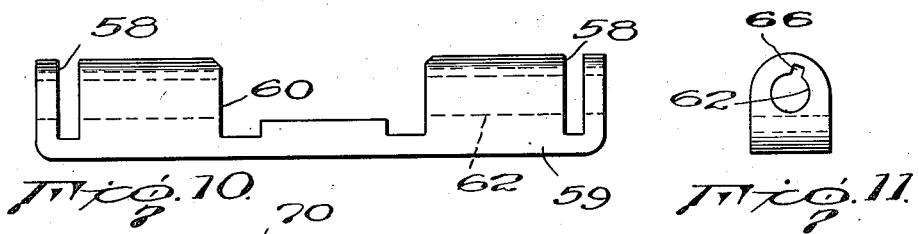
Fig. 10 is a plan view of the block per se.
Fig. 11 is an end elevational view of the same.
Figure 12:
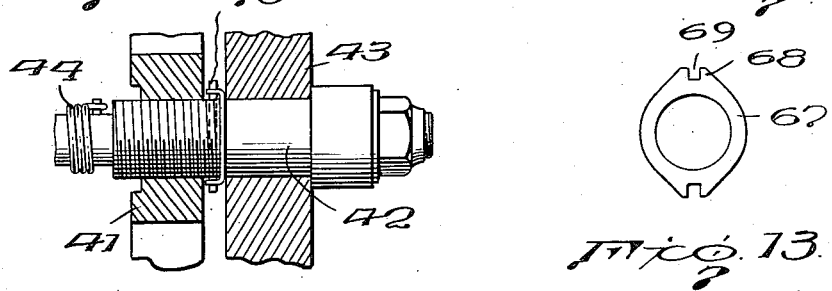
Fig. 12 is a side elevational view of one of the carriage journaling shafts showing a bracket and jaw mounted thereon, with an intervening locking washer.
Figure 13:
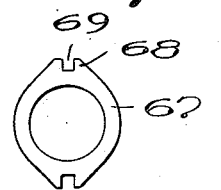
Fig. 13 is an elevational view of the locking washer, per se.

The track 29, although herein shown to be circular, may also be of a different configuration and is constructed to accommodate a carriage in a manner illustrated to advantage in Figs. 4, 5 and 6 of the drawings. The carriage 33 includes a frame or housing equipped with rollers 34 which engage the sides of the rail 29 and rollers 35 which engage the upper and lower faces of the track. One end of the frame has a handle 36 mounted thereon which may be employed to facilitate bodily movement of the carriage around the track. The carriage frame or housing is extended inwardly from the rail 29 and is formed to provide a bearing or socket 37 for the pintle 38 of a cradle yoke 39. A handle 40 is movably mounted on the carriage housing, operatively connected to jaws 41, with wedges 41', each jaw being mounted on a shaft 42, the latter supported by a housing bracket 43. In view of the illustration of these details in Figures 4, 6 and 10 of my copending application, Serial Number 370,026, and of the description thereof in the specification, page 3, lines 14 to 24, of said application, these details are only generally shown and described herein. The handle 40 is normally held in a downward locked position by springs 44 convoluted on and anchored to the shafts 42. When the handle is in this position, the jaws operate to cause a wedging action between certain of the rollers 34 and the track 29. When the handle is in an unlocked up position, shown by the dotted lines in Figs. 4 and 6, detents 45 carried by opposite sides of the carriage housing engage parallel sides 46 of the handle 40. When said handle is up the carriage is of course in an unbraked position. Downward pressure on the handle overcomes the restraining action of the detents 45 and permits the springs 44 to again function.

The yoke 39 has mounted therein a gun cradle generally designated 47 which, in the form illustrated in Figs. 6 and 7 is of novel construction. The cradle includes side plates 48 pivotally engaged by means of detachable bolts 49 with the upper ends of the arms of the yoke. The lower marginal edge of each cradle side 48 is extended, at one terminal of the side, to provide a lug 50, the lugs being arranged in parallel relation, engaging therebetween, the terminals of a gun pintle block 51. This block is provided with a vertical tapered opening approximately midway its ends, adapted for the reception of a complemental pin 52, the latter depending from a gun yoke 53. A quick detachable bolt 53', as shown to advantage in Fig. 7, extends through the side of the yoke 39, lugs 50, and base of the pintle block 51. The bolt is adapted to retain the gun at zero elevation for travel position. A gun 54 of conventional design is carried by the yoke 53. A latch generally designated 55 is mounted for transverse movement in the pintle block 51, the latch including a yieldable plunger 56 engageable in an annular recess 57 of the pin 52 to prevent casual displacement of the latter relative to pintle block 51.

Figure 9:
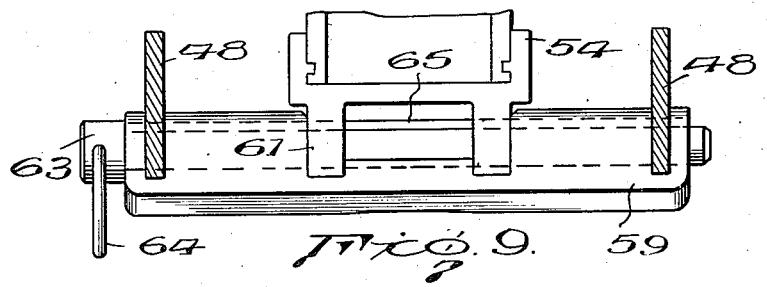
Fig. 9 is a plan view of the spacing block at the rear of the cradle, showing pin detachably mounted therein.

The rear ends of the sides 48 of the cradle engage slots 58 formed in a spacing block 59 adjacent the ends of the latter. An intermediate recess 60 is formed in the spacing block for the reception of a part of the gun 54, said gun part being provided with ears 61 having openings therein corresponding with a bore 62 in the spacing block adapted for the reception of a locking pin 63. One end of the pin carries a bail 64 to facilitate engagement and removal of the pin. The pin may be held from accidental displacement in any desired manner. In Fig. 9 the pin is shown equipped with a rib 65 engageable in a slot 66 which communicates with the bore 62. When the rib reaches the zone of the recess 60, rotation of the pin in either direction will cause the latter to be locked in an apparent manner.

To prevent displacement of the shafts 42 from the gun carriage, I provide a locking washer 67 which is provided at diametrically opposite points with extensions 68 in which recesses 69 are formed. One of these washers is adapted to be sleeved over each shaft between a bracket 43 and jaw 41, the extensions 68 being bent at right angles to permit a locking pin 70 to be engaged through said recesses and through an opening in the shaft which aligns with said recesses 69.

In the modification of the invention, illustrated in Fig. 8, a portion of a boat 20' is shown, provided with a cockpit 21' mounted in the deck 71 of the boat. A track 29' is arranged on the deck in a suitable manner, the track overhanging the cockpit 21' to be accessible to a person standing on the seat in the latter, in the same manner as the gun of the truck mount. The track, as shown in the drawing, is raised above the top of the cockpit and has a gun mount 72 rotatably mounted thereon, the mount carrying a gun 54'.

In use of this device, the operator stands on the seat of the truck, as illustrated in Fig. 1, the carriage is moved on the track to the desired position, and the angularity of the gun is adjusted to a firing position. Movement of the carriage is of course facilitated by use of the handle 36.

What is claimed is:

1. A vehicle including a truck body, a cab connected to one end of the body, the cab comprising a seat and an overhanging roof, the roof being provided with an opening of a size to accommodate a person standing on said seat, a gun track supported directly by the end of the truck body with which the cab is connected, the track overhanging the cab roof being in spaced relation to the latter, above the roof opening.

2. A device of the character described comprising a truck body and cab, a frame secured to the truck body, a part of the frame overhanging the cab, a track carried by said overhanging frame part separate from said cab, and an interconnected gun carriage and cradle movably mounted on said track.

3. A device of the character described comprising a truck body and seat, a frame secured to the truck body, a part of the frame overhanging the seat, a track carried by said overhanging frame part, and an interconnected gun carriage and cradle movably mounted on said track, said frame being collapsible and consisting of a plurality of detachably connected parts removably engaged with the truck body.

4. A device of the character described, comprising a truck body, a seat adjacent one end of the body, a frame secured to and carried by the truck body, a part of the frame extending forwardly therefrom to overhang said seat, a track carried by the part of the frame which overhangs the seat, and a gun rotatably mounted on the track for operation by a seat occupant.

5. A truck including a body, a driver's seat and roof overhanging the seat, the roof having an opening therein of a size sufficient to accommodate the upper part of a person, a frame mounted on the truck body with a portion thereof overhanging the roof and in spaced relation thereto, a circular track mounted on the part of the frame which overhangs the roof, and a gun rotatably mounted on the track and accessible for operation by a person standing upon said seat and extending upwardly through the roof opening within the confines of the track.

HAROLD W. EVANS.

REFERENCES CITED

The following references are of record in the file of this patent:

UNITED STATES PATENTS

| Number | Name | Date |
| --- | --- | --- |
| 159,612 | Scott | Feb. 9, 1875 |
| 854,449 | Austin | May 21, 1907 |
| 1,080,490 | Silveira | Dec. 2, 1913 |
| 1,230,361 | Allen | June 19, 1917 |
| 1,354,182 | Giangiopo | Sept. 28, 1920 |
| 1,447,895 | Schafer | Mar. 6, 1923 |
| 1,928,306 | Brennan | Sept. 26, 1933 |
| 1,968,182 | Trimbach | July 31, 1934 |
| 2,120,997 | Weitzenberg | June 21, 1938 |
| 2,143,900 | Rarey | Jan. 17, 1939 |
| 2,212,489 | Flesh | Aug. 20, 1940 |
| 2,227,726 | Laddon et al. | Jan. 7, 1941 |
| 2,228,179 | Motley | Jan. 7, 1941 |
| 2,252,079 | Laddon et al. | Aug. 12, 1941 |
| 2,318,130 | Trotter | May 4, 1943 |

FOREIGN PATENTS

| Number | Country | Date |
| --- | --- | --- |
| 307,757 | Germany | Sept. 20, 1919 |
| 527,397 | France | July 25, 1921 |
| 769,187 | France | June 5, 1934 |